UNITED STATES PATENT OFFICE.

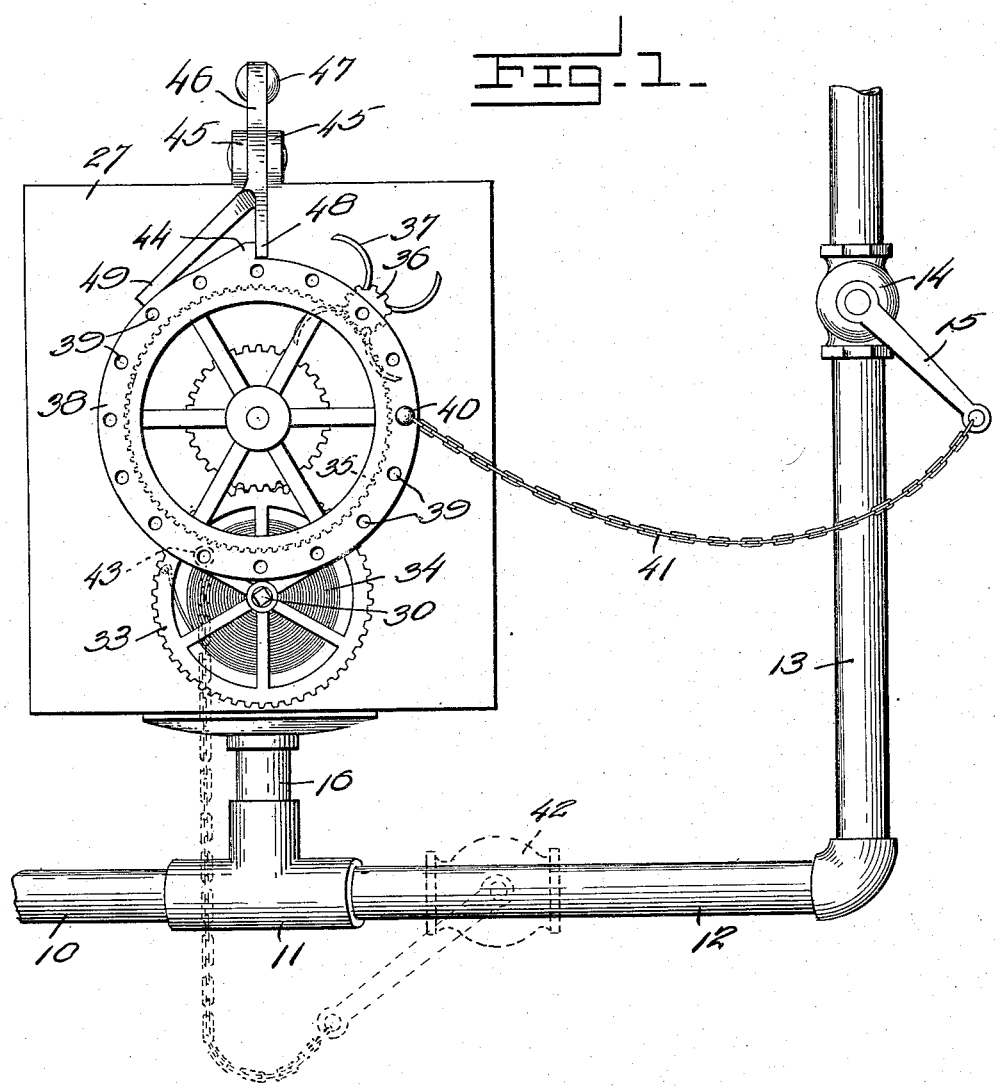

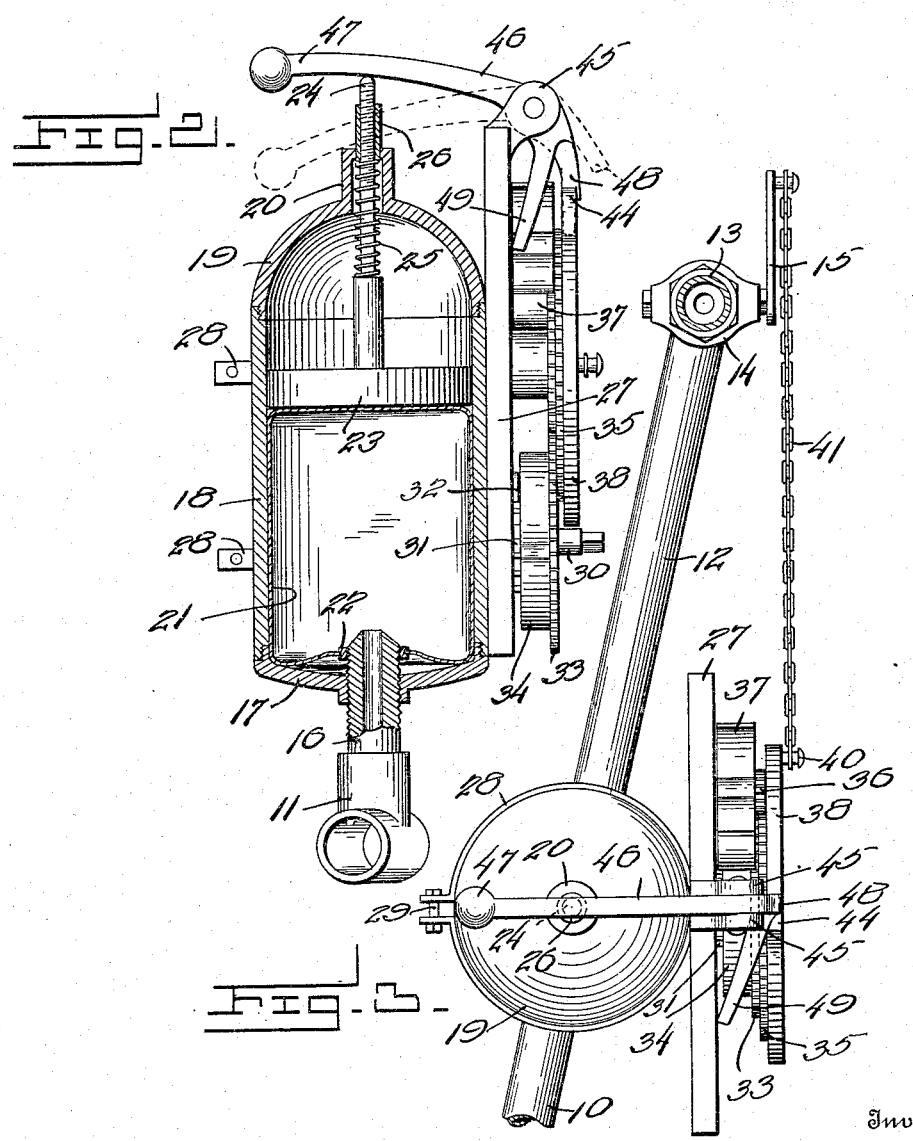

ELSWORTH LEWIS, OF SHREVE, OHIO.

AUTOMATIC GAS CUT-OFF.

1,170,831.  Specification of Letters Patent.  Patented Feb. 8, 1916.

Application filed August 13, 1913. Serial No. 784,533.

*To all whom it may concern:*

Be it known that I, ELSWORTH LEWIS, a citizen of the United States, residing at Shreve, in the county of Wayne and State of Ohio, have invented new and useful Improvements in Automatic Gas Cut-Offs, of which the following is a specification.

The invention has for an object to provide a device suitable for use in a service gas pipe of considerable size, or on a small pipe such as supplies a private dwelling.

It may also be used for individual fixtures, as it is extremely compact, simple and low in cost.

An important object is to insure the cut-off of the gas when below a predetermined pressure, and yet obviate liability of the gas being turned on by the mechanism.

A further important aim is to provide a device which will automatically be returned to set position, leaving the gas free to be turned on manually as soon as the gas pressure returns to normal.

A further purpose is to provide a novel cut-off mechanism which will be simple to construct and easily understood.

An additional object is to adapt the device to ready mounting on a pipe.

Additional objects and advantages will appear, some of which will be apparent from the following description, and from the drawings, in which,—

Figure 1 is a front elevation of the device, installed upon a pipe, Fig. 2 is a vertical cross section thereof, Fig. 3 is a top view thereof.

There is illustrated a horizontal service pipe 10, in which a T 11 is connected, and an angle 12 from which the pipe is continued, at at 13. A suitable plug valve 14 is mounted in the pipe, having an operating lever 15. Set in the stem of the T 11 there is a nipple 16, upon which there is threaded the base 17 of a piston chamber element including a cylinder 18 threaded upon a suitable flange of the base and having a cap 19 centrally apertured and provided with a spring seat recess 20 on the inner side. A rubber bag 21 of thin elastic rubber adapted to be expanded to fill the major part of the chamber is disposed in the lower part thereof, having a reduced orifice engaged around the upper end of the nipple which projects through the head for that purpose, the bag having a thickened neck 22 around the orifice to insure a gas tight connection. In the upper end of the chamber there is reciprocable a piston 23, provided with a stem 24 projecting upwardly through the cap 19, a spring 25 being engaged around the stem in the seat 20 and bearing downwardly upon the piston. Means may be provided for adjusting the tension on the spring, such as a hollow screw 26 engaged in the cap 19 around the stem 24.

The chamber being mounted as described, a plate 27 is clamped thereto by means of the ordinary spring clamp 28, secured to the back of the plate and held around the cylinder 18 by means of bolts, as at 29. A shaft 30 is mounted revolubly on the lower part of the plate, its movement being controlled in one direction by the ratchet and pawl 31 and 32, a gear 33 being also revoluble upon the shaft. A clock spring 34 has one end secured to the shaft and the other secured to the gear. By any suitable speed increasing gear train motion is communicated from the gear 33 to a large wheel 35 having gear teeth thereon meshed with the small gear 36 of a fan element 37, by which the speed of the device is controlled. The three elements last named are all mounted suitably upon the plate 27. The wheel 35 is provided at its outer side with a planiform annular flange 38 having a concentric series of apertures 39 therethrough, in one of which a removable wrist pin 40 is engaged. The wrist is connected by a slack chain 41 to the end of the lever 15, the wrist pin being on that side of the wheel 35 nearest the valve in normal position, and the valve being so arranged that the opening and closing movement of the lever 15 is approximately away from and toward the wheel. In the event that the pipe is a straight one without the lateral portion 13, the valve may be located as at 42, dotted in Fig. 1, and the wrist 40 changed in its position on the wheel 35 to approximately the position indicated at 43. In the same way, should the pipe lead from the right hand side instead of the left, and it is more convenient to locate the valve on a vertical continuation of the pipe at the left corresponding to the part 13, the wrist 40 may be engaged in the left hand side of the wheel 35, and where confined situations require it, valves may be located adjacent other radii of the wheel 35 and proper connections made, which will be understood from the foregoing, the number of apertures in the wheel enabling this adjustment.

The wheel is provided at one point in the periphery of the flange 38 with a tooth 44, having a radial side presented toward the direction of the rotation of the wheel, a beveled side extending in the opposite direction. Two pivot ears 45 are formed on the upper edge of the plate 27, between which is pivoted a double tooth detent 46 for movement in a plane at right angles to that of the wheel 35, the detent having a weighted arm 47 intersecting the axis of the stem 24 and resting across the outer end of the stem. The detent has a short bill 48 normally engaged with the tooth 44 and a laterally extending long bill 49 normally projecting out of the plane of the flange 38 and adapted to fall into alinement therewith when the piston 23 drops below a predetermined level. The bills 48 and 49 are arranged so that when one passes out of the plane of the flange 38 the other moves into engaging position. Thus, when the spring 34 is under proper tension, and the gas pressure is normal the short bill 48 holds the wheel 35 against rotation. When the pressure decreases below the minimum the piston and arm 47 fall until the long bill comes into the plane of the flange 38, at which time the short bill releases the tooth 44, permitting the wheel 35 to rotate until checked by engagement of the tooth with the long bill. In this movement of the wheel the chain 41 operates the lever 15 to cut off the gas beyond the T 11, the wrist thereafter returning to initial position, leaving sufficient slack in the chain to allow manipulation of the lever to open the valve.

The device is especially well adapted for use in such situations as service pipes are usually found in, where they usually lead close along the face of a wall. It is especially well adapted for manipulation in confined areas by reason of the detachable arrangement of the plate 27, and as before pointed out, the connections may be made with a valve on any radius of the wheel extending through one of the apertures of the flange 38.

It will be seen that by loosening the clamp 28 the plate 27 may be adjusted in various planes on the cylinder 18 so that connections may be made with pipes extending in any direction.

It will be readily understood that by having a sufficient length of chain and using some well known take-up hook, the connecting member 41 may be made extensible.

What is claimed:

1. A gas cut-off operating device comprising a chamber element, a support therefor, a plate carried by the chamber movable for concentric rotative adjustment thereon, means movable under fluctuation of pressure in the chamber including a member projecting therefrom, valve operating means carried by the plate tending to operate the valve, a detent carried by the plate engaged with the last named means having a portion disposed in the path of said member projecting from the chamber for engagement thereby and operation of the detent, and extensible valve connections engaged with said operating means.

2. A gas cut-off comprising a pressure operated reciprocating device, a rotatable wheel having a tooth thereon, a detent having a long and a short bill spaced on different radii on the wheel and adapted to lie respectively in the path of the tooth at opposite limits of movement of the detent, a valve, and lost motion connections between the wheel and valve for closing of the valve.

3. A safety gas cut-off comprising a valve having a manually operable operating member movable in one direction to close the valve, a wheel disposed in the direction of closing movement of the said member, and rotatable in a plane therewith, a flexible member eccentrically connected to the wheel and connected to the operating member for movement of the operating member from open to closed position, constructed and arranged to flex under rotation of the wheel when the valve is closed, means for rotating the wheel, a detent engaged in the wheel and pressure operated means for releasing the detent, and means to limit rotation of the wheel to reset position after release.

4. In a mechanism of the class described, a rotating wheel, means for rotating the wheel and means to control its rotation, a member movable in the plane of a wheel, away from and toward the wheel, said wheel having a concentric cyclically spaced series of lateral openings therein, a wrist member removably engageable in the openings and connections between the wrist and said movable member.

In testimony whereof I have hereunto set my hand in presence of the subscribing witnesses.

ELSWORTH LEWIS.

Witnesses:
URBANUS STOUT SAUNDERS,
HARRY BELL BERTOLETTE,
JOHN MELVIN CHAPMAN.

Copies of this patent may be obtained for five cents each, by addressing the "Commissioner of Patents, Washington, D. C."